US010530234B2

(12) United States Patent
Cheng (10) Patent No.: US 10,530,234 B2
(45) Date of Patent: Jan. 7, 2020

(54) MAGNETIC COUPLING CONTROL DEVICE AND MAGNETIC COUPLING DEVICE

(71) Applicant: Hsi-Chieh Cheng, Nantou (TW)

(72) Inventor: Hsi-Chieh Cheng, Nantou (TW)

( * ) Notice: Subject to any disclaimer, the term of this patent is extended or adjusted under 35 U.S.C. 154(b) by 106 days.

(21) Appl. No.: 15/858,235

(22) Filed: Dec. 29, 2017

(65) Prior Publication Data

US 2019/0173369 A1 Jun. 6, 2019

(30) Foreign Application Priority Data

Dec. 4, 2017 (TW) .................................. 106142433

(51) Int. Cl.
*H02K 49/10* (2006.01)
(52) U.S. Cl.
CPC ......... *H02K 49/102* (2013.01); *H02K 49/106* (2013.01); *H02K 49/108* (2013.01); *Y02E 60/16* (2013.01); *Y02T 10/6204* (2013.01)
(58) Field of Classification Search
CPC .. H02K 49/102; H02K 49/106; H02K 49/108; Y02E 60/16; Y02T 10/6204
USPC ....................................................... 310/103
See application file for complete search history.

(56) References Cited

U.S. PATENT DOCUMENTS

| 5,258,697 | A * | 11/1993 | Ford | H02K 21/20 318/498 |
| 7,268,454 | B2 * | 9/2007 | Wise | H02K 7/025 310/103 |
| 8,786,153 | B2 * | 7/2014 | Underwood | F03G 3/00 310/101 |
| 2002/0186647 | A1 * | 12/2002 | Her | G11B 33/00 369/266 |
| 2007/0110576 | A1 * | 5/2007 | Hong | F04D 25/16 415/220 |
| 2007/0210659 | A1 * | 9/2007 | Long | H02K 9/10 310/80 |
| 2014/0015362 | A1 * | 1/2014 | Cheng | H02K 49/102 310/99 |
| 2014/0060241 | A1 * | 3/2014 | Atkins | F16F 15/18 74/572.11 |

(Continued)

FOREIGN PATENT DOCUMENTS

TW M512421 11/2015
TW M535574 1/2017

*Primary Examiner* — Alex W Mok
(74) *Attorney, Agent, or Firm* — Muncy, Geissler, Olds & Lowe, P.C.

(57) ABSTRACT

A magnetic coupling device includes a magnetic flywheel unit including a flywheel and multiple first magnets equiangularly spaced around the periphery of the flywheel to form a first annular magnetic series with the same pole facing toward the radial outer side of the flywheel, and a magnetic coupling unit including a plate body rotatably mounted to the periphery of the flywheel, a rotating shaft mounted to the center of axis of the plate body, multiple second magnets and third magnets alternatively mounted on the plate body around the rotating shaft to create a second annular magnetic series that is magnetically coupled to the first annular magnetic series. Further, a magnetoresistive ring frame is mounted to the periphery of the flywheel for movement along the axial direction of the flywheel to create a magnetic coupling control device.

6 Claims, 9 Drawing Sheets

(56) References Cited

U.S. PATENT DOCUMENTS

2015/0061435 A1* 3/2015 Wu .................... H02K 49/043
                                                        310/74

* cited by examiner

MAGNETIC COUPLING CONTROL DEVICE AND MAGNETIC COUPLING DEVICE

BACKGROUND OF THE INVENTION

1. Field of the Invention

The present invention relates to magnetic coupling technology and more particularly, to a magnetic coupling control device and a magnetic coupling device.

2. Description of the Related Art

Magneto-resistance device used in general fitness equipment (such as flywheel) is that a magnetic control unit is pivotably arranged on the outer edge or the inner edge of the flywheel. By adjusting the distance between the magnetic control unit and the flywheel, the resistance caused by the magnetic control unit on the flywheel is relatively adjusted. Taiwan Patent M512421 teaches installation of a pivoting member in an inner edge of a flywheel and mounting of a magnet on the pivoting member so that the magnetic resistance force can be adjusted by means of adjusting the distance between the pivoting member and the flywheel. Further, Taiwan Patent M535574 teaches the installation of a magnetic control unit in an outer edge of a flywheel so that when the flywheel is rotated by a pedal mechanism, the magnetic control unit is caused to generate eddy current for producing a magnetic force to attract the flywheel and to further produce the desired resistance in the exercise.

However, by adjusting the distance between the magnetic series and the flywheel to adjust the magnetic resistance, the relationship between the magnetic resistance and the distance is nonlinear. Therefore, the moving distance of the magnetic series needs to be adjusted non-linearly to make the magnetic resistance linear, or it needs to install some adjustment mechanisms in the resistance device so that the relationship between the magnetic resistance and the displacement of the adjusting mechanism can be linear. This will lead to complication of the magnetic control method or an increase in production costs.

Further, there is known another kind of magnetic control device, which utilizes an electromagnet as magnetic control unit to generate magnetic resistance force to the flywheel. However, the electromagnet needs a considerable amount of power to generate magnetic force, causing heat generation of the electromagnet. After a long use of the electromagnet, the high temperature will be difficult to dissipate. Further, as flywheel rotates at a high speed, it is difficult to measure and control the temperature of the flywheel. In addition, the temperature of the electromagnet also causes a magnetic drop, so the amount of power needs to be adjusted to make up the magnetic force. This magnetic control design of using electromagnet to generate magnetic resistance is complicated, and difficult to control the precision.

Based on the above description, the conventional magnetic control unit still has drawbacks, which need to be improved.

SUMMARY OF THE INVENTION

The present invention has been accomplished under the circumstances in view. It is the main object of the present invention to provide a magnetic coupling control device, which has the structure accurately constructed and allows control and adjustment of the magnetic resistance force in a stable manner, eliminating the problem of heat generation of the electromagnet in the magnetic control device as seen in the prior art design, and allowing the magnetic coupling control device to output the energy of the flywheel rotation by magnetic coupling.

To achieve this and other objects of the present invention, a magnetic coupling control device comprises a magnetic flywheel unit, a magnetoresistive ring frame and a magnetic coupling unit. The magnetic flywheel unit comprises a flywheel mounted to an external machine, and a plurality of first magnets mounted at the periphery of the flywheel and equiangularly spaced around the center of axis of the flywheel to form a first annular magnetic series. Each first magnet comprises a first magnetic pole facing toward the center of axis of the flywheel, and a second magnetic pole opposite to the first magnetic pole. The magnetoresistive ring frame is mounted to the external machine around the periphery of the flywheel and movable along the axial direction of the flywheel. The magnetic coupling unit is mounted to the external machine and located on the periphery of the flywheel, comprising a plate body, a rotating shaft, a plurality of second magnets and a plurality of third magnets. The plate body is rotatably mounted to the external machine and located on the periphery of the flywheel. The plate body comprises a bottom surface facing toward the second magnetic pole of each first magnet. The rotating shaft is mounted to the center of axis of the plate body for synchronous rotation with the plate body. The second magnets and the third magnets are alternatively mounted on the plate body around the rotating shaft. The first magnetic pole of each second magnet is disposed to face toward the second magnetic pole of one respective first magnet. The second magnetic pole of each third magnet is disposed to face toward the second magnetic pole of one respective first magnet. The first magnetic poles of the second magnets and the second magnetic poles of the third magnets together form a second annular magnetic series that is magnetically coupled to the first annular magnetic series.

Preferably, the magnetic coupling control device further comprises at least three positioning rods mounted in the external machine and inserted through the magnetoresistive ring frame for allowing movement of the magnetoresistive ring frame on the positioning rod along the axial direction of the flywheel.

Preferably, the magnetoresistive ring frame comprises an outer ring frame, and a conducting inner ring frame mounted within the outer ring frame. The positioning rods are inserted through the outer ring frame for allowing movement of the outer ring frame on the positioning rods to carry the conducting inner ring frame along the axial direction of the flywheel.

Preferably, the conducting inner ring frame are selectively made of aluminum or copper.

Preferably, the distance between each two adjacent first magnets is equal to the width of one first magnet.

Preferably, the rotating shaft is selectively connected with a fan module, a power generating module or an output shaft.

Thus, as the external machine drives the flywheel to rotate, the first magnets are synchronously rotated, causing rotation of each second magnet, each third magnet, the plate body and the rotating shaft by magnetic repulsion and magnetic attraction. With the fan module, the power generating module or the output shaft disposed on the rotating shaft, it achieves the effect of dissipating the heat generated by the magnetic coupling control device, generating electricity or outputting the rotating energy of the flywheel to external devices.

Further, as the magnetoresistive ring frame moves along the axial direction of the flywheel, the conducting inner ring frame overlaps the first annular magnetic series on the flywheel, and the overlapped area is relatively changed with the movement of the magnetoresistive ring frame, resulting in a linear proportional relationship between the magnetic resistance force and the moving distance of the magnetoresistive ring frame to achieve the effect of accurately controlling the resistance provided by the magnetic coupling control device.

It is another object of the present invention to provide a magnetic coupling device comprising a magnetic flywheel unit and a magnetic coupling unit. The magnetic flywheel unit comprises a flywheel mounted to an external machine, and a plurality of first magnets mounted at the periphery of the flywheel and equiangularly spaced around the center of axis of the flywheel to form a first annular magnetic series. Each first magnet comprises a first magnetic pole facing toward the center of axis of the flywheel, and a second magnetic pole opposite to the first magnetic pole. The magnetic coupling unit is mounted to the external machine and located on the periphery of the flywheel, comprising a plate body, a rotating shaft, a plurality of second magnets and a plurality of third magnets. The plate body is rotatably mounted to the external machine and located on the periphery of the flywheel. The plate body comprises a bottom surface facing toward the second magnetic pole of each first magnet. The rotating shaft is mounted to the center of axis of the plate body for synchronous rotation with the plate body. The second magnets and the third magnets are alternatively mounted on the plate body around the rotating shaft. The first magnetic pole of each second magnet is disposed to face toward the second magnetic pole of one respective first magnet. The second magnetic pole of each third magnet is disposed to face toward the second magnetic pole of one respective first magnet. The first magnetic poles of the second magnets and the second magnetic poles of the third magnets together form a second annular magnetic series that is magnetically coupled to the first annular magnetic series.

Preferably, the distance between each two adjacent first magnets is equal to the width of one first magnet.

Preferably, the rotating shaft is selectively connected with a fan module, a power generating module or an output shaft.

Thus, as the external machine drives the flywheel to rotate, the first magnets are synchronously rotated, causing rotation of each second magnet, each third magnet, the plate body and the rotating shaft by magnetic repulsion and magnetic attraction. With the fan module, the power generating module or the output shaft disposed on the rotating shaft, it achieves the effect of dissipating the heat generated by the magnetic coupling control device, generating electricity or outputting the rotating energy of the flywheel to external devices.

Other advantages and features of the present invention will be fully understood by reference to the following specification in conjunction with the accompanying drawings, in which like reference signs denote like components of structure.

DETAILED DESCRIPTION OF THE INVENTION

Figure 1:
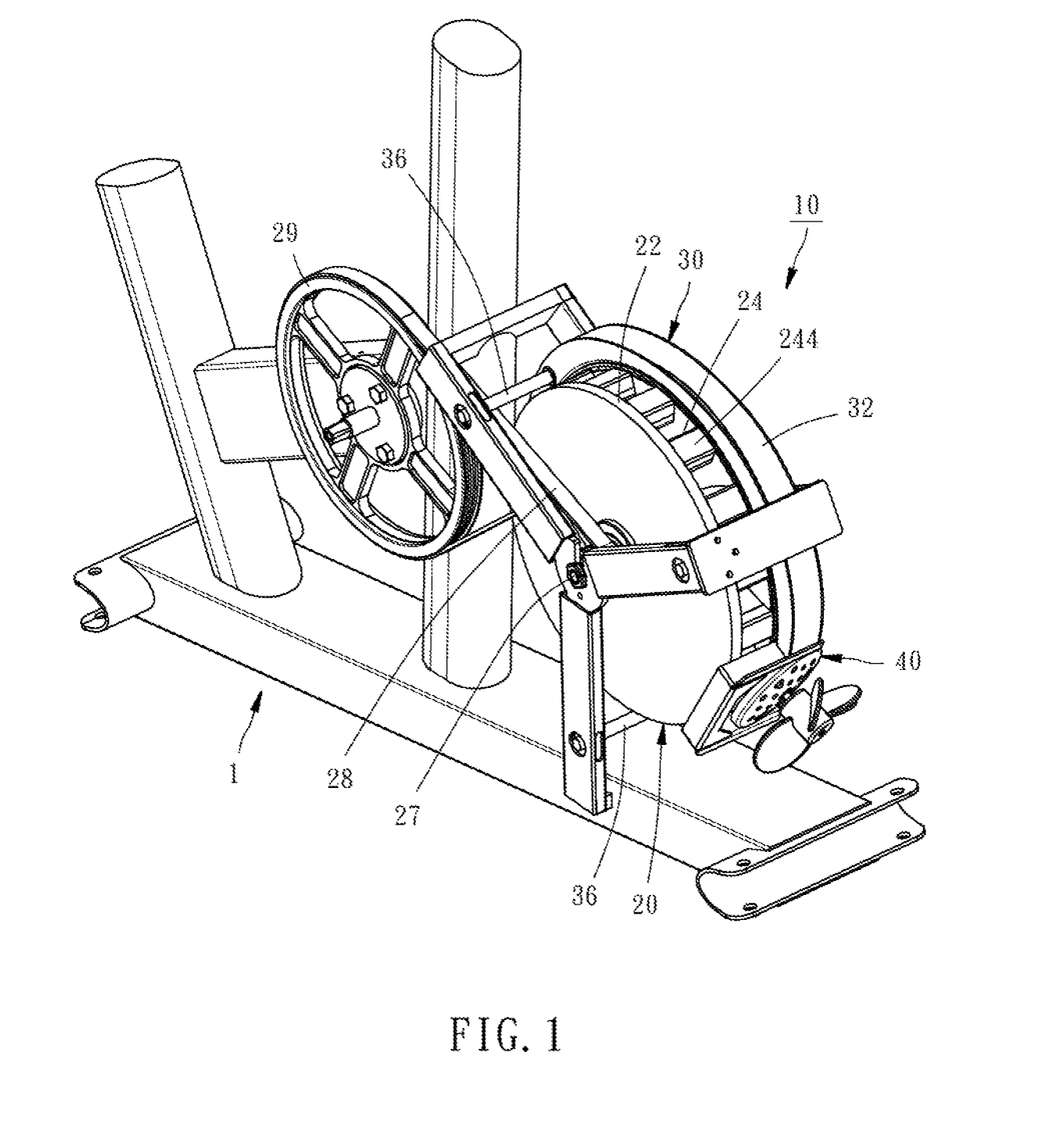
FIG. 1 is an elevational view illustrating a magnetic coupling control device installed in an external machine in accordance with the present invention.
Figure 2:
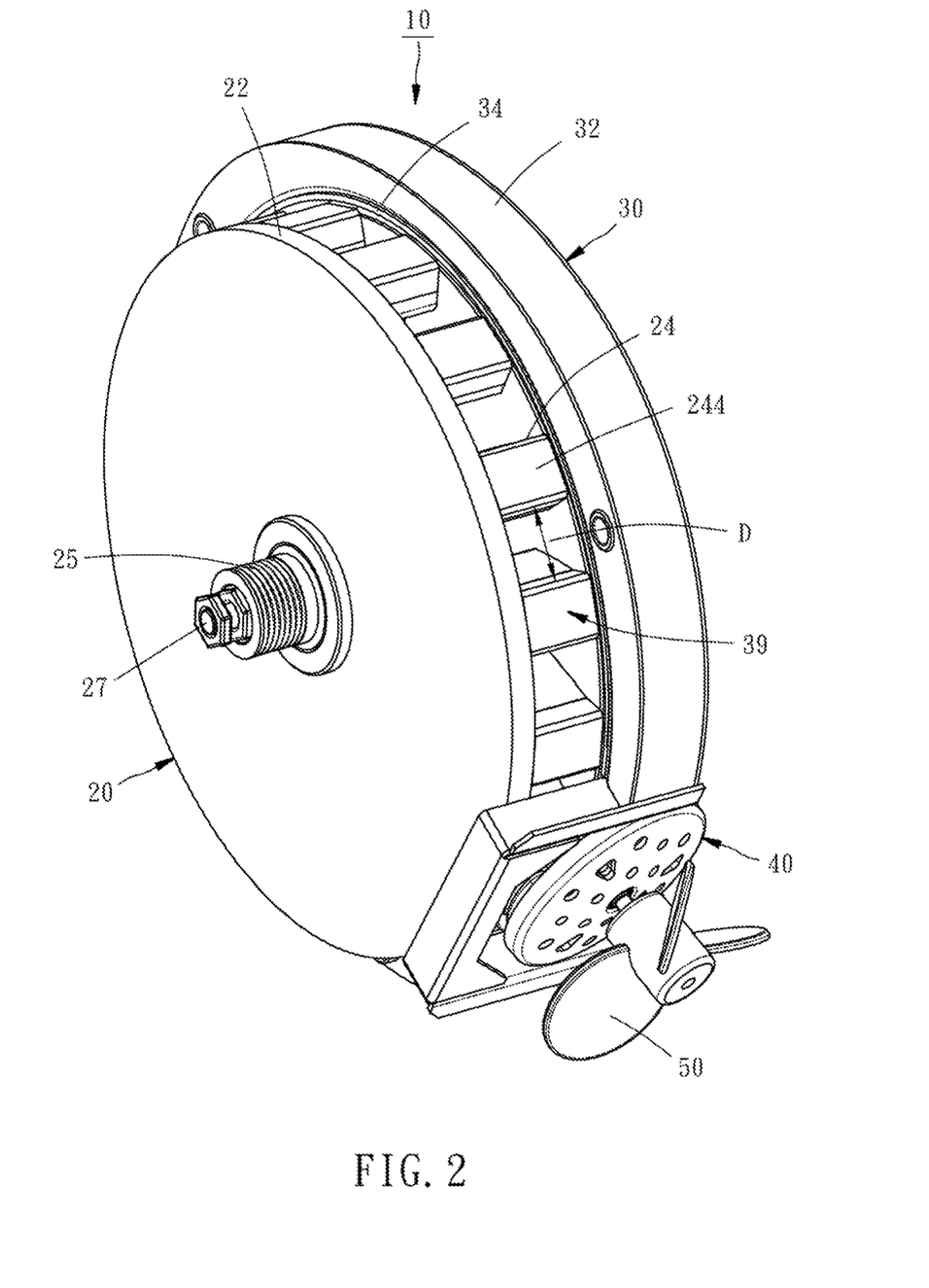
FIG. 2 illustrates movement of the magnetoresistive ring frame along the axial direction of the flywheel (I).
Figure 3:
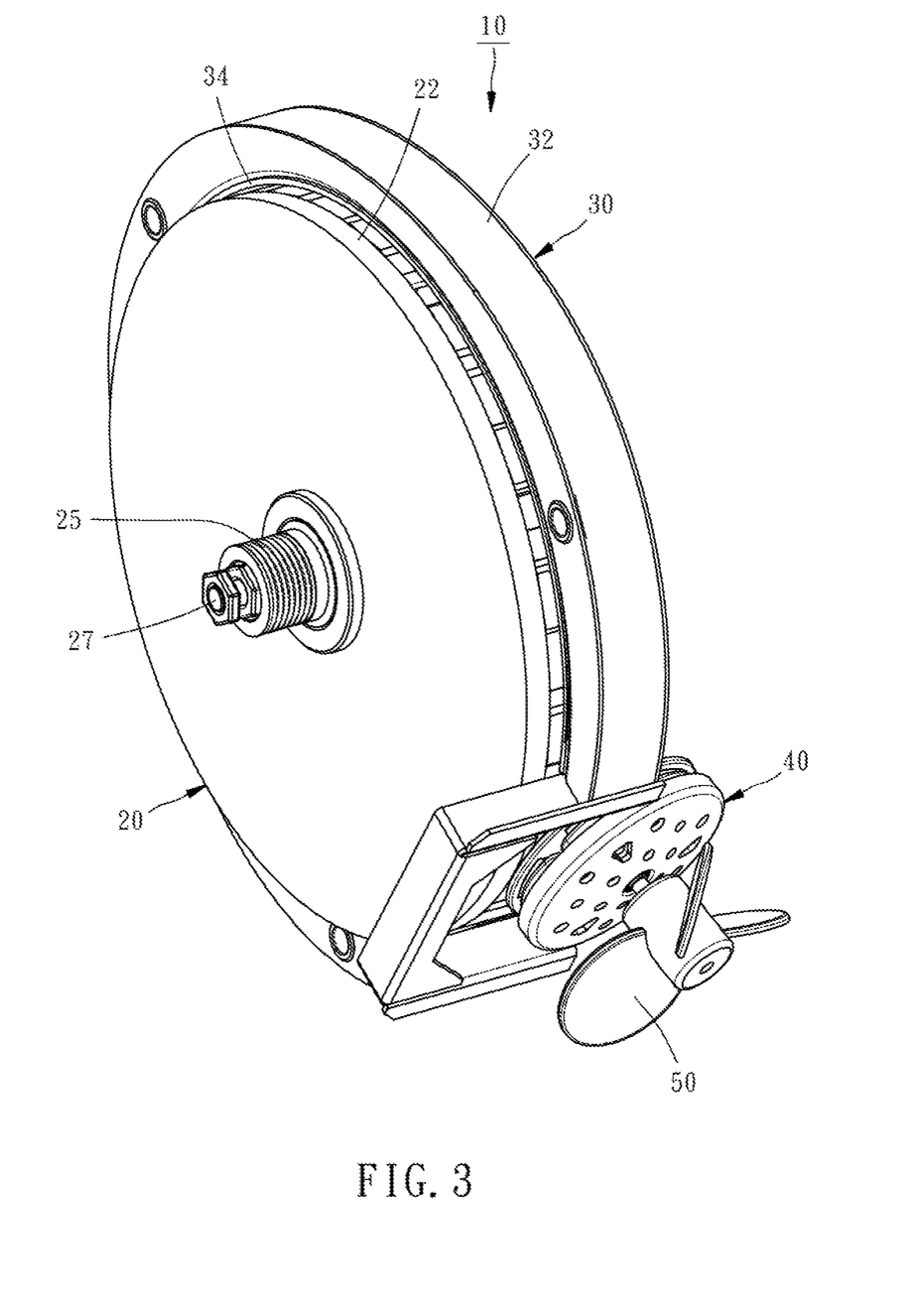
FIG. 3 illustrates movement of the magnetoresistive ring frame along the axial direction of the flywheel (II).

Referring to FIGS. 1-3, a magnetic coupling control device 10 in accordance with the present invention is used in an external machine 1. Preferably, the external machine 1 is a sports fitness equipment, for example, but not limited to, exercise bike. The magnetic coupling control device 10 comprises a magnetic flywheel unit 20, a magnetoresistive ring frame 30 and a magnetic coupling unit 40.

Referring to FIGS. 1-3, the magnetic flywheel unit 20 comprises a flywheel 22 and a plurality of first magnets 24. The flywheel 22 is shaped like a disc and mounted to the external machine 1. More to the point, an axle bushing 25 and an axle shaft 27 are provided at the center of axis of the flywheel 22. The axle bushing 25 is coaxially mounted at the center of axis of the flywheel 22 and synchronously rotatable with the flywheel 22. The axle shaft 27 is coaxially inserted through the axle bushing 25 and the flywheel 22 and mounted in the external machine 1 for allowing rotation of the flywheel 22 on the external machine 1. In this embodiment, the axle bushing 25 is coupled with a transmission belt 28; the transmission belt 28 is coupled to a runner 29 at the external machine 1; the runner 29 is mounted to a crank pedal (not shown). When pedaling the crank pedal to rotate the runner 29, the transmission belt 28 is synchronously driven to rotate the axle bushing 25 and the flywheel 22.

The first magnets 24 are permanent magnets. Each first magnet 24 defines opposing first magnetic pole 242 and second magnetic pole 244. The multiple first magnets 24 are arranged on the rim of the flywheel 22 and equiangularly spaced around the center of axis of the flywheel 22 to create a first annular magnetic series 39. More to the point, the multiple first magnets 24 are arranged on the rim of the flywheel 22 and equiangularly spaced around the center of axis of the flywheel 22 in the present preferred embodiment. In other embodiments of the present invention, the first magnets 24 can be directly mounted to the annular side off the flywheel 22 and equiangularly spaced around the center of axis of the flywheel 22. The first magnetic pole 242 of each first magnet 24 faces toward the center of axis (axial direction) of the flywheel 22. The second magnetic pole 244 of each first magnet 24 faces toward the radial outer side of the flywheel 22. The first magnetic pole 242 and the second magnetic pole 244 are respectively S pole and N pole, or respectively N pole and S pole. Further, a predetermined distance D is defined between each two adjacent first magnets 24.

The magnetoresistive ring frame 30 is mounted to the external machine 1 around the periphery of the flywheel 22, and movable axially relative to the flywheel 22. More to the point, the magnetic coupling control device 10 comprises at least 3 positioning rods 36. These positioning rods 36 are mounted to the external machine 1 in parallel to the axial direction of the flywheel 22 and inserted through the magnetoresistive ring frame 30 for allowing movement of the magnetoresistive ring frame 30 along these three positioning rods 36 in the axial direction of the flywheel 22. More to the point, the magnetoresistive ring frame 30 comprises an outer ring frame 32 and a conducting inner ring frame 34. The conducting inner ring frame 34 is mounted within the outer ring frame 32. The positioning rods 36 are inserted through the outer ring frame 32 for allowing movement of the outer ring frame 32 on the positioning rods 36 to carry the conducting inner ring frame 34 along the axial direction of the flywheel 22. The conducting inner ring frame 34 is made of high conductivity material such as aluminum, copper or silver. As illustrated in FIGS. 2 and 3, when the magnetoresistive ring frame 30 is displaced in the axial direction of the flywheel 22, the conducting inner ring frame 34 will overlap and cover the first annular magnetic series 39 that is formed by the first magnets 24 on the flywheel 22 and cause a magnetic resistance to the flywheel 22 which in turn provides a resistance to the flywheel 22 that is pedaled by the user.

Further, as the magnetoresistive ring frame 30 moves, the overlap area between the conducting inner ring frame 34 and the first annular magnetic series 39 is relatively changed, causing change in the magnetic resistance. The size of the magnetic resistance and the displacement distance of the magnetoresistive ring frame 30 presents a linear proportional relationship, thereby achieving precise control of the resistance of the magnetic coupling control device 10.

Figure 4:
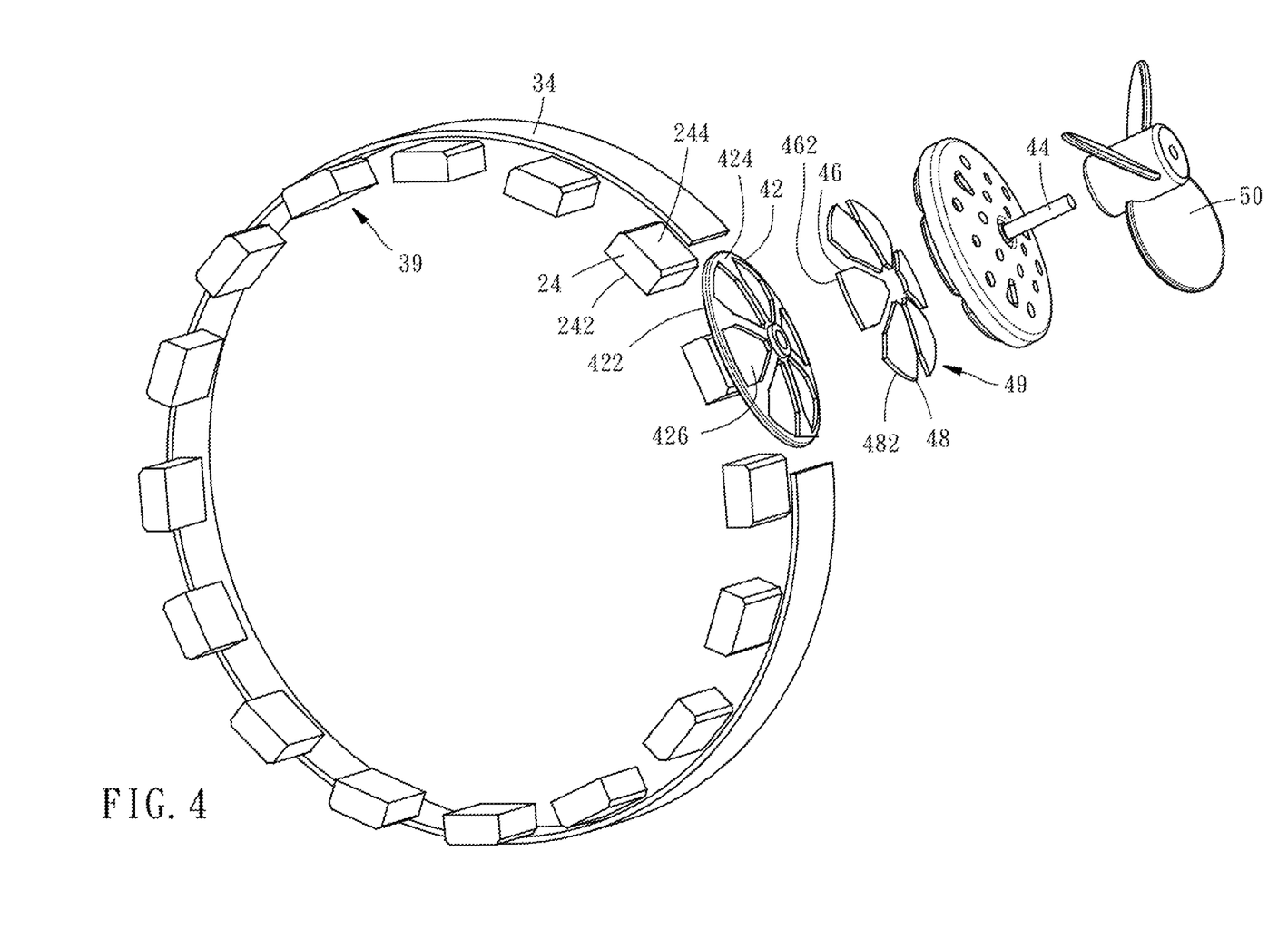
FIG. 4 is an exploded view of the magnetic coupling control device in accordance with the present invention, illustrating the positioning relationship between the magnetic coupling unit and the first annular magnetic series.

Referring to FIG. 4, the magnetic coupling unit 40 is installed in the external machine 1 and located on the periphery of the flywheel 22. The magnetic coupling unit 40 comprises a plate body 42, a rotating shaft 44, a plurality of second magnets 46 and a plurality of third magnets 48. The plate body 42 is rotatably mounted to the external machine 1 and located on the periphery of the flywheel 22. The plate body 42 defines a bottom surface 422 and an opposing top surface 424. The bottom surface 422 of the plate body 42 faces toward the second magnetic poles 244 of the first magnet 24. The rotating shaft 44 is mounted in the center of axis of the plate body 42 and synchronously rotatable with the plate body 42. In the present preferred embodiment, the rotating shaft 44 is connectable with a fan module 50, a power generating module (not shown) or an output shaft (not shown) for dissipating heat, generating electricity or outputting power to other devices. The second magnets 46 and the third magnets 48 in the present preferred embodiment are permanent magnets, and the number is three. The second magnets 46 and the third magnets 48 are alternatively mounted on the plate body 42 around the rotating shaft 44. More to the point, the plate body 42 comprises a plurality of mounting holes 426 spaced around the rotating shaft 44 for the mounting of the second magnets 46 and the third magnets 48. Each second magnet 46 has the first magnetic pole 462 thereof facing toward the second magnetic pole 244 of the first magnet 24. Each third magnet 48 has the second magnetic pole 482 thereof facing toward the second magnetic pole 244 of the first magnet 24. It is worth mentioning that the polarity of the first magnetic pole 462 is reversed to the polarity of the second magnetic pole 244, respectively N pole and S pole, or respectively S pole and N pole, and thus, the first magnet 24 and the respective second magnet 46 attract each other. The polarity of the second magnetic pole 482 and the polarity of the second magnetic pole 244 are same, respectively S pole, or respectively N pole, and thus, the first magnet 24 and the respective third magnet 48 repel each other.

Figure 8:
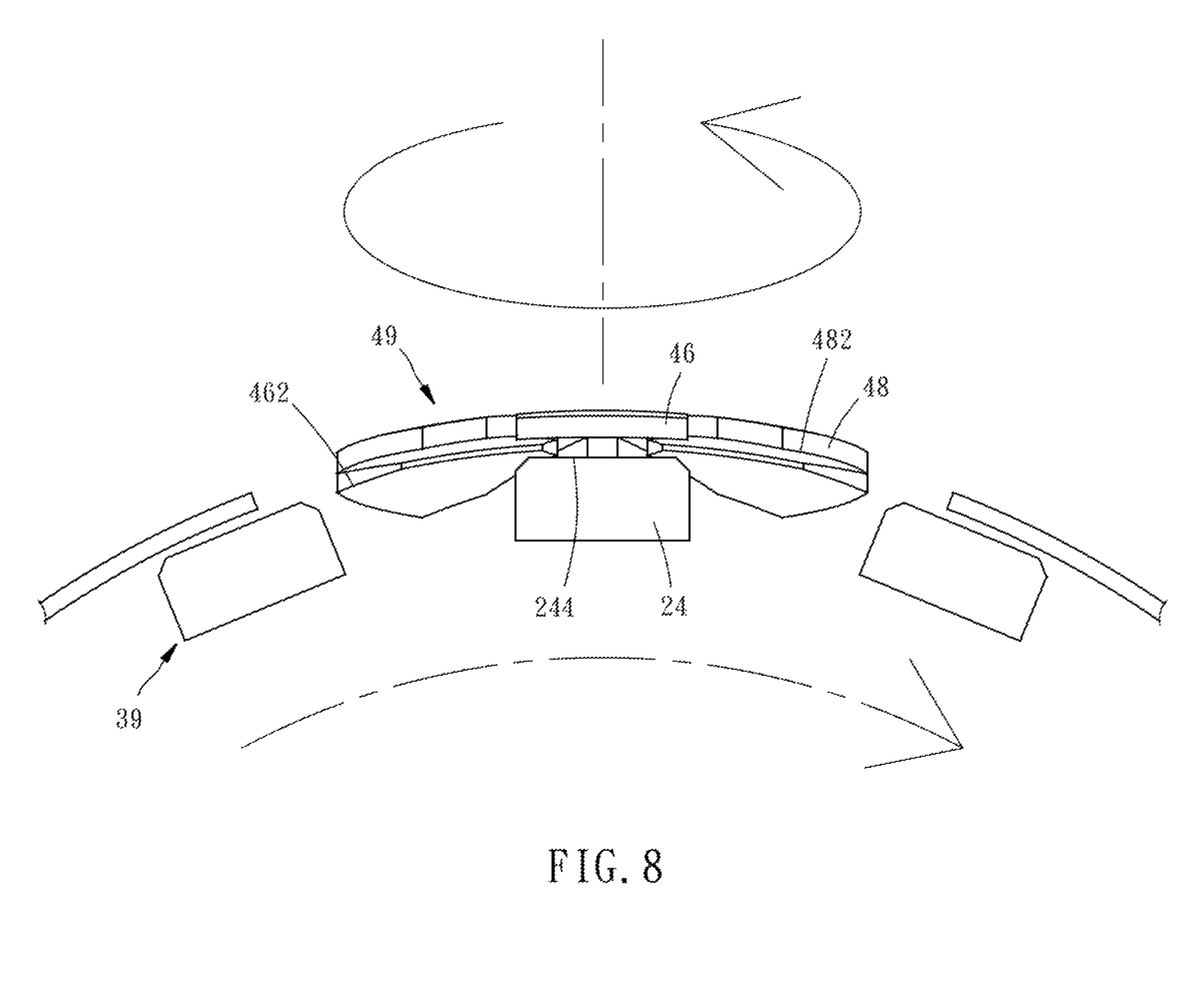
FIG. 8 is a schematic drawing illustrating the relationship between the second annular magnetic series and the first annular magnetic series.

Referring to FIG. 8, the second magnets 46 and the third magnets 48 form a second annular magnetic series 49. The second annular magnetic series 49 is magnetically coupled to the first annular magnetic series 39 by sphere zone coupling mean. More to the point, please refer to paragraphs 0031, 0032 and 0035 and FIGS. 1 and 4 of the specification and drawings of US20140015362, sphere zone coupling mean couples two magnetic arrays of the same sphere center but different axial directions with an air-gap left between these two magnetic arrays. Since the two magnetic arrays are formed by the magnets adjacent to each other with different magnetic poles, when one rotating body rotates, the other rotating body can be driven to rotate by a magnetic force. The non-contact sphere zone coupling between the second annular magnetic series 49 and each first magnet 24 of the present invention is equivalent the coupling between the two magnetic arrays of the same sphere center but different axial directions in US20140015362 with the exception that the first annular magnetic series 39 is made of the same magnetic polarity, and therefore, the second annular magnetic series 49 and the first annular magnetic series 39 provide a larger coupling area to produce a larger coupling magnetic force.

Further, the predetermined distance D between each two adjacent first magnets 24 is equal to the width of one first magnet 24.

Figure 5:
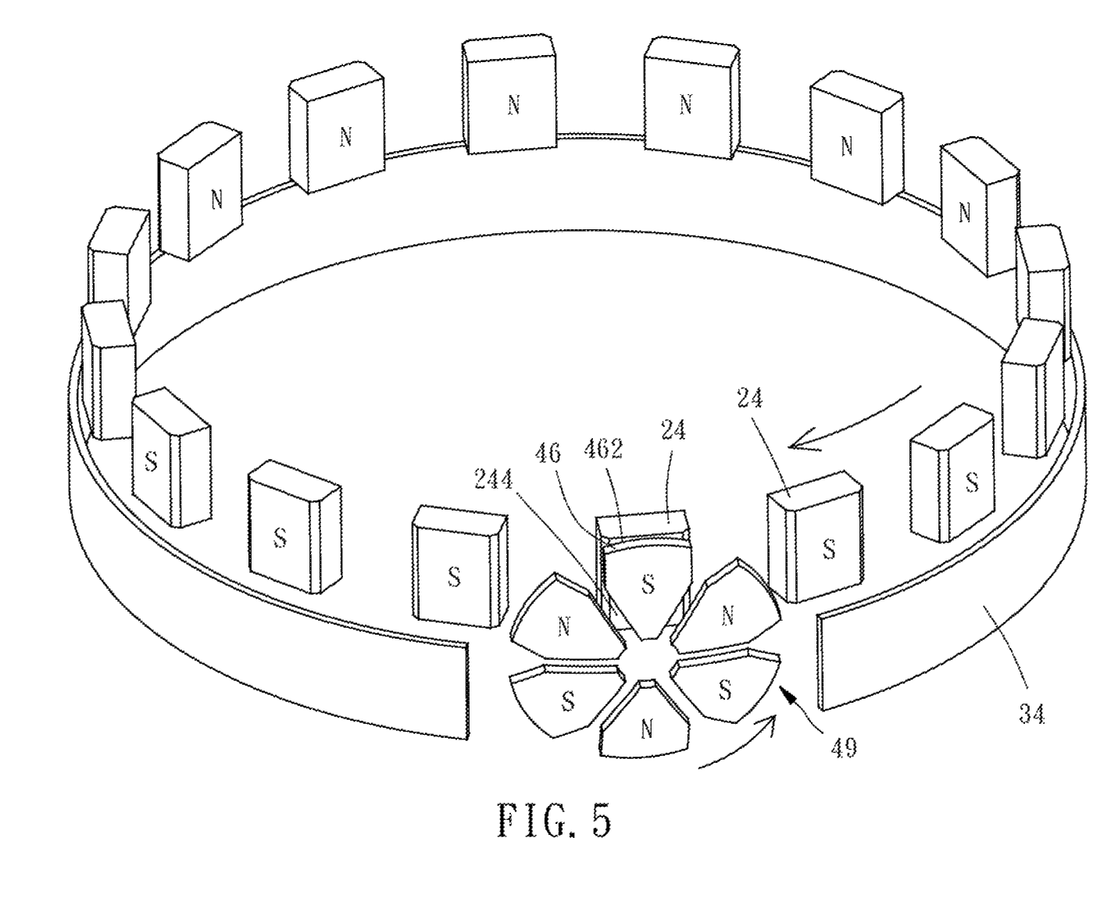
FIG. 5 is a schematic drawing illustrating movement of the magnetic coupling unit with the first annular magnetic series (I).
Figure 6:
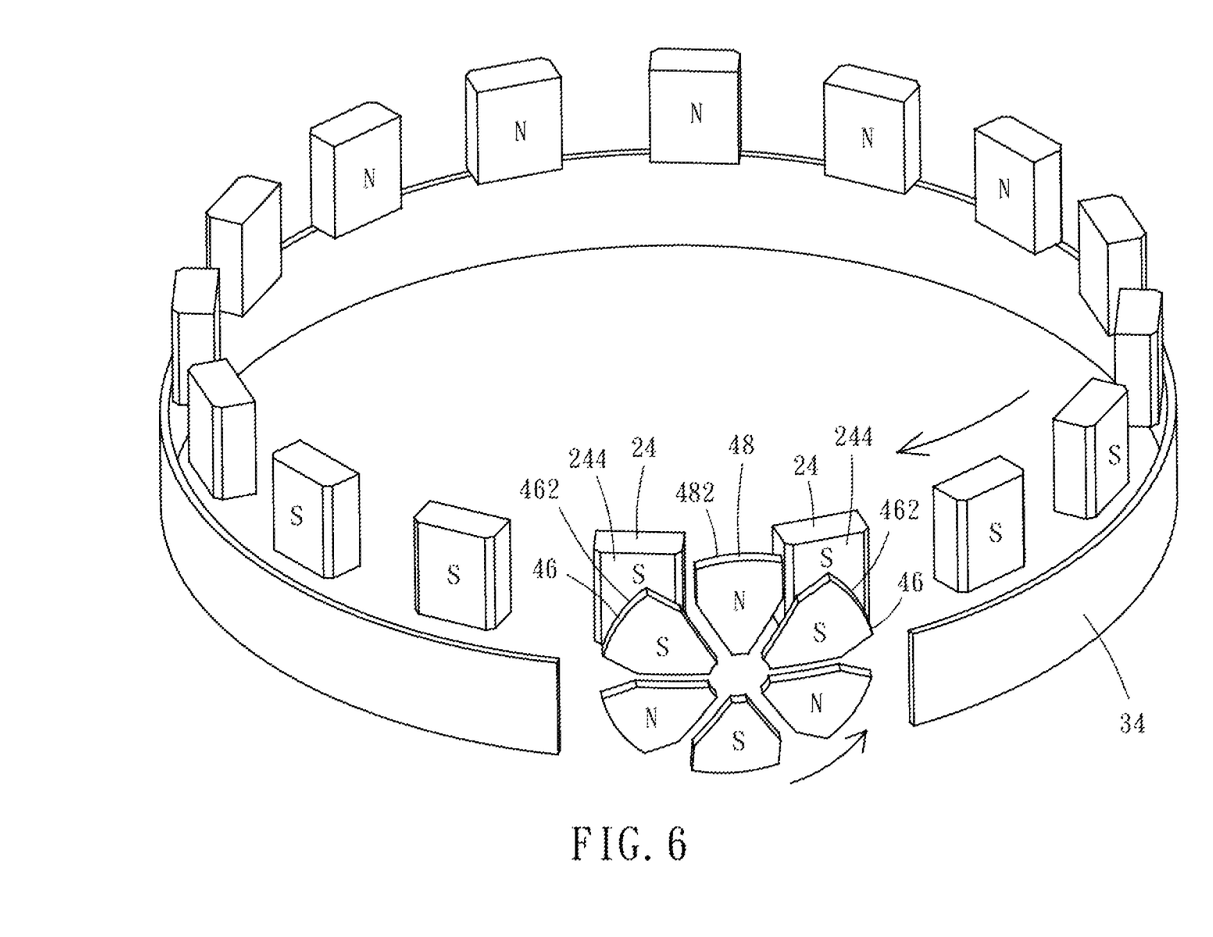
FIG. 6 is a schematic drawing illustrating movement of the magnetic coupling unit with the first annular magnetic series (II).
Figure 7:
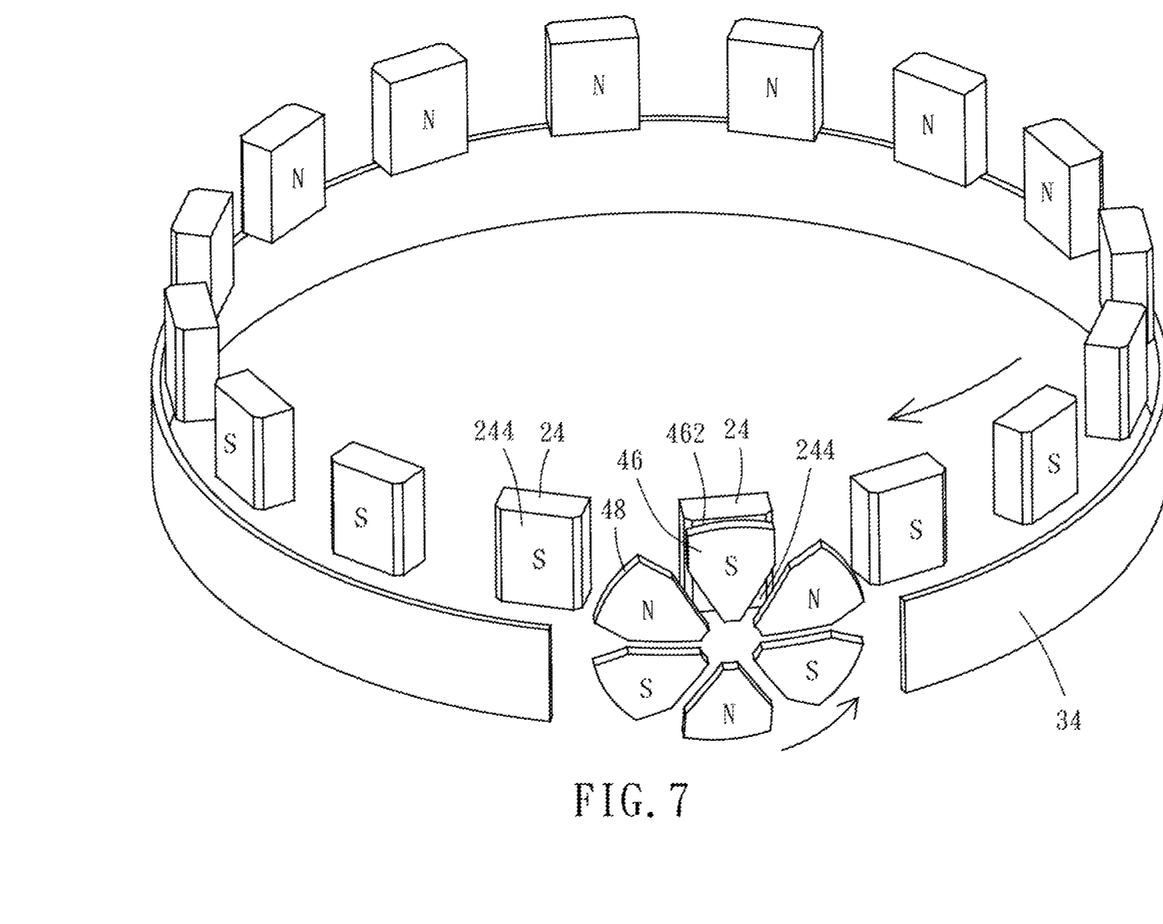
FIG. 7 is a schematic drawing illustrating movement of the magnetic coupling unit with the first annular magnetic series (III).

FIGS. 5-7 show that the flywheel 22 actuates the magnetic coupling unit 40. As illustrated in FIG. 5, as the flywheel 22 rotates, it carries the first magnets 24 to rotate, at this time, the second magnetic pole 244 of one first magnet 24 attracts the first magnetic pole 462 of one second magnet 46. Thereafter, as illustrated in FIG. 6, as the flywheel 22 rotates, the second magnetic pole 244 of the first magnet 24 drives the first magnetic pole 462 of the second magnet 46 to move along the moving path of the first magnet 24, at this point, the magnetic repulsion between two first magnets 24 causes the third magnet 48 to be located between these two first magnets 24. Thereafter, as illustrated in FIG. 7, as the flywheel 22 rotates, the third magnet 48 is driven by the magnetic repulsion of the two first magnets 24 to move along the moving path of the first magnets 24, and the first magnets 24 attract and carry the second magnet 46 to move along the moving path of the first magnets 24. By repeating the above cycle, the purpose of rotating the plate body 42 and the rotating shaft 44 by the rotation of the flywheel 22 can be achieved.

Since the two adjacent first magnets 24 are separated by a predetermined distance D, the third magnet 48 can be stably held between the two adjacent first magnets 24, smoothening the rotation of the plate body 42 and the rotating shaft 44.

Based on the above description, as the external machine 1 drives the flywheel 22 to rotate, the first magnets 24 are synchronously rotated, causing rotation of each second magnet 46, each third magnet 48, the plate body 42 and the rotating shaft 44 by magnetic repulsion and magnetic attraction. With the fan module 50, the power generating module or the output shaft disposed on the rotating shaft 44, it achieves the effect of dissipating the heat generated by the magnetic coupling control device 10, generating electricity or outputting the rotating energy of the flywheel 22 to external devices.

Further, as the magnetoresistive ring frame 30 moves along the axial direction of the flywheel 22, the conducting inner ring frame 34 overlaps the first annular magnetic series 39 on the flywheel 22, and the overlapped area is relatively changed with the movement of the magnetoresistive ring frame 30, resulting in a linear proportional relationship between the magnetic resistance force and the moving distance of the magnetoresistive ring frame 30 to achieve the effect of accurately controlling the resistance provided by the magnetic coupling control device 10.

Figure 9:
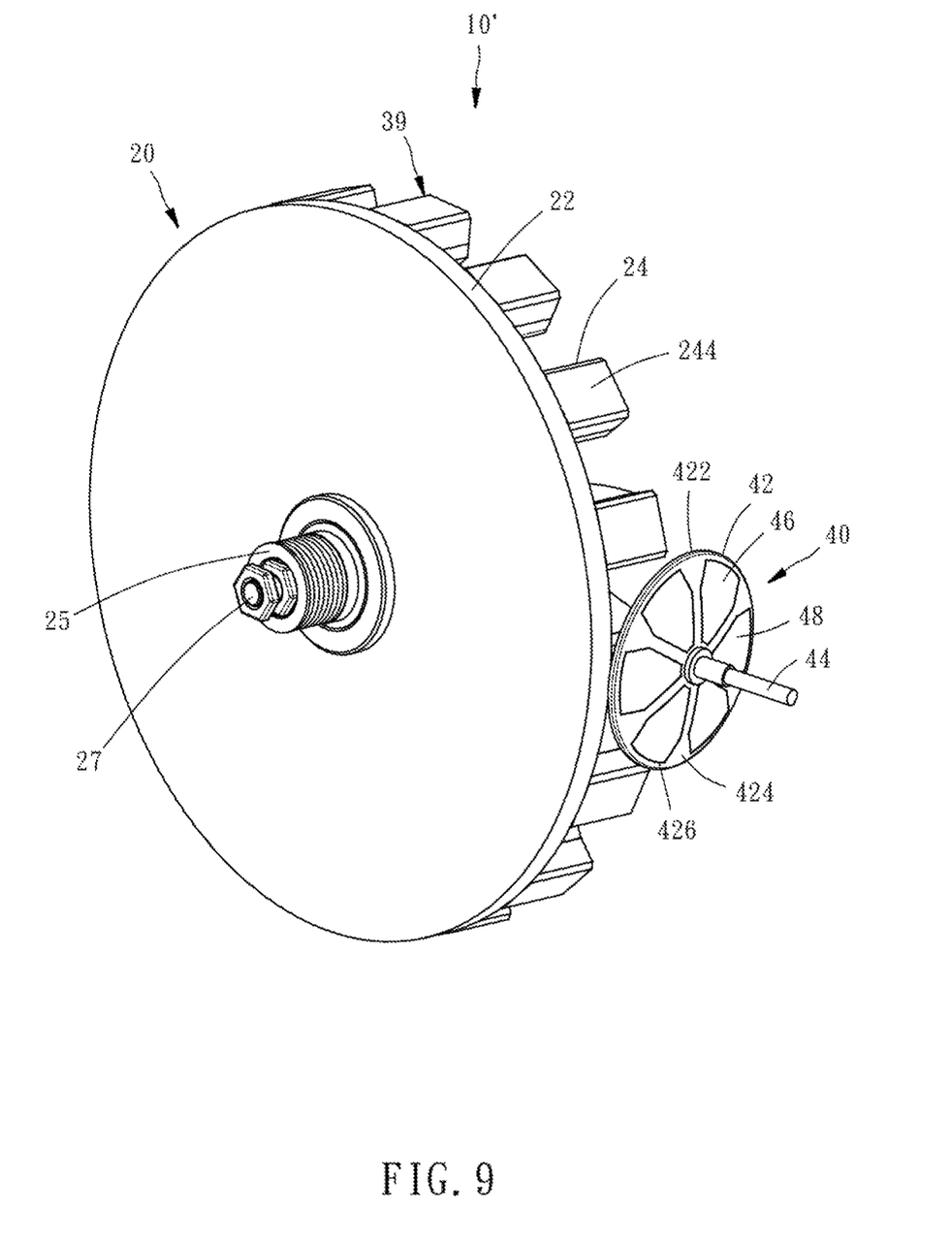
FIG. 9 is an elevational view of a magnetic coupling device in accordance with the present invention.

Referring to FIG. 9, a magnetic coupling device 10' is shown. This magnetic coupling device 10' is substantially similar to the aforesaid magnetic coupling control device 10 with the exception that the magnetic coupling device 10' eliminates the aforesaid magnetoresistive ring frame 30, and simply uses the magnetic flywheel unit 20 to magnetically couple the magnetic coupling unit 40. Thus, as the external machine 1 drives the flywheel 22 to rotate, the first magnets 24 are synchronously rotated, causing rotation of each second magnet 46, each third magnet 48, the plate body 42 and the rotating shaft 44 by magnetic by magnetic repulsion and magnetic attraction. With the fan module 50, the power generating module or the output shaft disposed on the rotating shaft 44, it achieves the effect of dissipating the heat generated by the magnetic coupling device 10', generating electricity or outputting the rotating energy of the flywheel 22 to external devices.

Finally, it must be stated again that the constituent elements disclosed in the foregoing embodiments and the polarities of the second magnetic pole 244, the first magnetic pole 462 and the second magnetic pole 482 are only illustrative and not intended to limit the scope of the invention. The exchange of polarity or the substitution or variation of other equivalent components shall also be covered by the scope of the present application.

What is claimed is:

1. A magnetic coupling control device, comprising:
    a magnetic flywheel unit comprising a flywheel mounted to an external machine and a plurality of first magnets mounted at the periphery of said flywheel and equiangularly spaced around the center of axis of said flywheel to form a first annular magnetic series, each said first magnet comprising a first magnetic pole facing toward the center of axis of said flywheel and a second magnetic pole opposite to said first magnetic pole;
    a magnetoresistive ring frame mounted to said external machine around the periphery of said flywheel and movable along the axial direction of said flywheel; and
    a magnetic coupling unit mounted to said external machine and located on the periphery of said flywheel, said magnetic coupling unit comprising a plate body, a rotating shaft, a plurality of second magnets and a plurality of third magnets, said plate body being rotatably mounted to said external machine and located on the periphery of said flywheel, said plate body comprising a bottom surface facing toward the second magnetic pole of each said first magnet, said rotating shaft being mounted to the center of axis of said plate body for synchronous rotation with said plate body, said second magnets and said third magnets being alternatively mounted on said plate body around said rotating shaft, the first magnetic pole of each said second magnet being disposed to face toward the second magnetic pole of one respective said first magnet, the second magnetic pole of each said third magnet being disposed to face toward the second magnetic pole of one respective said first magnet;
    wherein, the first magnetic poles of said second magnets and the second magnetic poles of said third magnets together form a second annular magnetic series, said second annular magnetic series being magnetically coupled to said first annular magnetic series.

2. The magnetic coupling control device as claimed in claim 1, further comprising at least three positioning rods mounted in said external machine and inserted through said magnetoresistive ring frame for allowing movement of said magnetoresistive ring frame on said positioning rod along the axial direction of said flywheel.

3. The magnetic coupling control device as claimed in claim 2, wherein said magnetoresistive ring frame comprises an outer ring frame and a conducting inner ring frame mounted within said outer ring frame; said positioning rods are inserted through said outer ring frame for allowing movement of said outer ring frame on said positioning rods to carry said conducting inner ring frame along the axial direction of said flywheel.

4. The magnetic coupling control device as claimed in claim 3, wherein said conducting inner ring frame are selectively made of aluminum or copper.

5. The magnetic coupling control device as claimed in claim 1, wherein the distance between each two adjacent said first magnets is equal to the width of one said first magnet.

6. The magnetic coupling control device as claimed in claim 1, wherein said rotating shaft is selectively connected with a fan module, a power generating module or an output shaft.

* * * * *